United States Patent

(12) United States Patent
Liu et al.

(10) Patent No.: US 8,463,418 B2
(45) Date of Patent: Jun. 11, 2013

(54) METHODS AND APPARATUS FOR FABRICATING POROUS 3-DIMENSIONAL CELL CULTURE CONSTRUCT FOR CELL CULTURE AND OTHER BIOMEDICAL APPLICATIONS

(75) Inventors: Qing Liu, Hillsborough, NJ (US); Wing K. Lau, Basking Ridge, NJ (US)

(73) Assignee: 3D BioTek, LLC, Hillsborough, NJ (US)

( * ) Notice: Subject to any disclaimer, the term of this patent is extended or adjusted under 35 U.S.C. 154(b) by 339 days.

(21) Appl. No.: 12/674,259

(22) PCT Filed: Aug. 18, 2008

(86) PCT No.: PCT/US2008/073433
§ 371 (c)(1),
(2), (4) Date: Feb. 19, 2010

(87) PCT Pub. No.: WO2009/026200
PCT Pub. Date: Feb. 26, 2009

(65) Prior Publication Data
US 2011/0196660 A1    Aug. 11, 2011

Related U.S. Application Data

(60) Provisional application No. 60/957,356, filed on Aug. 22, 2007.

(51) Int. Cl.
G06F 19/00       (2011.01)
(52) U.S. Cl.
USPC ......................................................... 700/119

(58) Field of Classification Search
USPC ........... 700/98, 118, 119, 120, 123; 264/40.1, 264/40.7, 75, 308
See application file for complete search history.

(56) References Cited

U.S. PATENT DOCUMENTS

| | | | |
|---|---|---|---|
| 4,138,463 A * | 2/1979 | Moneghan | 264/40.4 |
| 5,764,521 A | 6/1998 | Batchelder | |
| 5,979,794 A * | 11/1999 | DeFillipi et al. | 239/135 |
| 6,730,252 B1 | 5/2004 | Teoh | |
| 2002/0113331 A1 | 8/2002 | Zhang | |

OTHER PUBLICATIONS

Written Opinion and International Search Report for International Patent Application No. PCT/US08/73433 issued Nov. 19, 2008.

(Continued)

Primary Examiner — Kavita Padmanabhan
Assistant Examiner — Chad Rapp
(74) Attorney, Agent, or Firm — Lowenstein Sandler LLP

(57) ABSTRACT

The present invention provides an RP system which can directly use hot melt polymers for fabricating porous 3D construct for cell culture and other biomedical applications based on a CAD design. To realize the direct use of polymer hot melt, the RP system uses a hot melt chamber which is mounted on a robotic dispensing arm or a XYZ motion control system. The hot melt chamber is equipped with a delivery mechanism to force the molten polymer passing through a nozzle. The extruded polymer thin filament deposits onto the positions according to the computer generated model, in a layer-by-layer fashion, similar to FDM. The present invention can use any type of thermal plastic polymer pellets, beads, particles, which are suitable for extrusion and injection molding, as well as composites of two or more different thermal plastic polymer blends, inorganic particle/thermal plastic composites.

17 Claims, 3 Drawing Sheets

OTHER PUBLICATIONS

Zahir, N., et al., "Death in the Third Dimension: Apoptosis Regulation and Tissue Architecture," Current Opinion in Genetics and Development, vol. 14., 2004, p. 71-80.

Dhiman, et al., "Characterization and Evaluation of Chitosan Matrix for in Vitro Growth of MCF-7 Breast Cancer Cell Lines," Biomaterials, vol. 25, 2004, p. 5147-5154.

Abbott, A., et al., "Cell Culture: Biology's New Dimension," Nature, vol. 424, Aug. 2003, p. 870-872.

Baker, S., et al., "Characterisation of Electrospun Polystyrene Scaffolds for Three-Dimensional in Vitro Biological Studies," Biomaterials, vol. 27, 2006, p. 3136-3146.

Schmeichel, K., et al., "Modeling Tissue-Specific Signaling and Organ Function in Three Dimensions," Journal of Cell Science, vol. 116, 2003, 2377-2388.

Hutmacher, D., et al., "Scaffold Design and Fabrication Technologies for Engineering Tissues—State of the Art and Future Perspectives," Journal of Biomaterials Science, Polymer Edition, vol. 12, No. 1, 2001, p. 107-124.

Hayman, M.W., et al., "Growth of Human Stem Cell-Derived Neurons on Solid Three-Dimensional Polymers," Journal of Biochemical and Biophysical Methods, vol. 62, 2005, p. 231-240.

Ferrera, D., et al., "Three-Dimensional Cultures of Normal Human Osteoblasts: Proliferation and Differentiation Potential in Vitro and Upon Ectopic Implantation in Nude Mice," Bone, vol. 30, No. 5, May 2002, p. 718-725.

Kale, S., et al., "Three-Dimensional Cellular Development is Essential for Ex Vivo Formation of Human Bone," Nature Biotechnology, vol. 18, Sep. 2000, p. 954-958.

Martin, I., et al., "The Role of Bioreactors in Tissue Engineering," Trends in Biotechnology, vol. 22, No. 2, Feb. 2004, p. 80-86.

Tallheden, T., et al., "Gene Expression During Redifferentiation of Human Articular Chondrocytes," OsteoArthritis and Cartilage, vol. 12, 2004, p. 525-535.

\* cited by examiner

METHODS AND APPARATUS FOR FABRICATING POROUS 3-DIMENSIONAL CELL CULTURE CONSTRUCT FOR CELL CULTURE AND OTHER BIOMEDICAL APPLICATIONS

This application claims priority to U.S. Provisional Patent Application Ser. No. 60/957,356 filed Aug. 22, 2007, the disclosure of which is hereby incorporated by reference in its entirety for all purposes.

FIELD OF THE INVENTION

The present invention relates to methods for fabricating a porous three dimensional cell culture construct for biomedical applications, such as used for cell culture in conventional cell culture vessels, such as cell culture dish, cell culture plate, cell culture flasks, cell culture bag and bioreactors. The invention further provides methods for packaging the 3D constructs with cell culture vessels to form a kit for cell culture use.

BACKGROUND OF THE INVENTION

Cell culture is a very useful and widely used technique in pharmaceutical development, cell biology, toxicology, bioengineering and tissue engineering fields. Conventional cell cultures are conducted in cell culture vessels, such as in 2, 4, 6, 24, 96 well cell culture plates made from non-degradable polymers such as polystyrene, polypropylene, and polyvinyl chloride, etc. These plates are often been surface treated to improve the hydrophilicity of the surface so that the cells being cultured can better adhere to the 2 dimensional surfaces of the culture plate. In a typical cell culture experiment, cells cultured in the cell culture plastic vessels are grown in cell culture medium in monolayer in a 2-dimensional fashion.

While culturing cells in two dimensions (2D) is a convenient method for preparing, observing and studying cells and their interactions with pharmaceuticals, biological factors and biomaterials in vitro. It does not mimic the cell growth fashion in vivo. In real living body, cells are often growing in three dimensions (3D) and building three dimensional living tissue or organ. Emerging evidence showed that 3D cell culture systems in vitro can facilitate the understanding of structure-function relationship in normal and pathological tissue conditions. Studies also showed that 3D culture is a better model for the cytotoxic evaluation of anticancer drugs in vitro [Harpreet et al, Biomaterials, 2005, 26:979-986]. Moreoevr, growing evidence showed that three-dimensional (3D) environment also reveals fundamental mechanisms of cell function and that 3D culture systems in vitro can facilitate the understanding of structure-function relationship in normal and pathological conditions [Abbott et al, Nature, 2003; 424 (6951):870-2; Hutmacher et al, Journal of Biomaterials Science, Polymer Edition, 2001; 12:107-24; Schmeichel et al, Journal of Cell Science, 2003, 116:2377-2388; Zahir et al, Current Opinion In Genetics & Development 2004, 14:71-80; Martin et al, Trends In Biotechnology, 2004; 22:80-6]. It is now well accepted that bone and cartilage-derived cells behave differently in a 3 dimensional (3D) than in a two-dimensional (2D) environment and that the 3D culture systems in vitro are mimicking the in vivo situation more closely than the two-dimensional (2D) cultures (Kale et al, Nature Biotechnology, 2000, 18:954-8; Ferrera et al, Bone 2002, 30:718-25; Tallheden et al, Osteoarthritis and Cartilage, 2004, 12:525-35).

So far the evidence has shown clearly that culturing cells in a 3D environment will offer tremendous advantages over 2D culture environment. However, with the current 3D gel systems, the cultured cells are embedded within the gel matrix which makes the exchange of the nutrient and metabolic products of the cultured cells problematic because of the diffusion limitation of the gel. Also, unlike culturing cells in 2D cell culture plates, in which case cells can be easily detached from the culture plate using a trypsin solution and isolated by centrifugation, cells cultured in 3D gel systems are very difficult to recover or isolate because the cultured cells are embedded within the gel. Additionally, culturing cells within a gel matrix requires preparation of the gel system each time before the culture, which is not only inconvenient to the researchers, especially when the large quantities of cultures have to be done, but also non-consistent between the different batches of gel preparations caused by the slight different ways of gel preparation among different researchers and laboratories.

Polystyrene, polyethylene, polyamide, polyethylene terephthalate), polypropylene and polycarbonate are non-degradable polymers and have been used as a substrate material for conducting two-dimensional (2D) cell culture. Cell culture vessels and membranes made from above mentioned polymers are widely used and commercially available in many different sizes and configurations from many suppliers. Since these polymers are quite familiar to the researchers who are doing cell or tissue culture, it is conceivable that a 3D cell culture system made from these polymers would offer not only the advantages of a 3D culture environment, but also offer many other advantages that a 2D cell culture system would offer, such an well defined surface property and ease of use.

The use of polystyrene in fabrication 3D matrix for cell culture has been little explored. Recently, Baker et al (Baker et al, Biomaterials, 2006; 27, 3136-46) reported that they fabricated a 3D porous fibrous polystyrene matrix using a electro-spinning technique. The obtained fibrous 3D polystyrene matrix was a non-woven mat where the inter-fibrous space served as the porous space. Study data suggested that these polystyrene 3D fibrous scaffolds complemented 2D polystyrene cell culture plate systems. However, the disadvantage of these fibrous polystyrene matrix are The control of the fiber size is difficult; the pore size and shape of the matrix are not well defined; The average pore size was small (~15 microns), and the fibrous matrix are soft in nature which makes it difficult for further cell culture manipulation without deforming the matrix.

Other researchers also tried to make a more robust porous polystyrene matrix for routine cell culture. They used a high internal phase emulsion (HIDE) as a template to create the porous polystyrene structure (Hayman, et al, J. Biochemical and Biophysical Methods, 2005, 62:231-240). Highly porous polystyrene foams were prepared from poly(styrene/divinylbenzene) system. Study showed that human neurons adhered well to poly-d-lysine coated surfaces and extended neural processes. Neurite outgrowth was particularly enhanced when the surface also received a coating of laminin. However, there are also some disadvantages associated with this polystyrene foams, such as the pore size and pore distribution can not be very well controlled due to the inherent nature of this foaming method, the very torturous porous structure also makes the nutrient exchange difficult.

Due to above mentioned drawbacks associated with the use of current available 3D culture matrix, 2D cell culture is still the primary cell culture method despite the advantages of the 3D culture will offer. Therefore, a 3D culture system which has well defined pore size and porosity for routine 3 dimensional cell culture will be extremely valuable. The present invention provides methods to fabricate 3D cell culture construct which can be used as an insert to the cell culture vessels for conducting 3D cell culture.

Rapid Prototyping (RP) is a technology that produces models and prototype parts from 3D computer-aided design (CAD) model data and model data created from 3D object digitizing systems. Rapid prototyping technologies have also been explored for the development of manufacturing approaches to create surgical implant models for orthopedic and craniofacial surgical procedures. RP systems provide possibilities in fabricating porous 3D object with well controlled channels or pores.

One of the rapid prototyping techniques called 3-Dimensional Printing (3DP) has been used to fabricate bioresorbable porous scaffolds for tissue engineering applications. The technology is based on the printing of an organic solvent binder, such as chloroform and methylene chloride, through a print head nozzle onto a polymer powder bed. However, the removal of entrapped powder is typically quite difficult. Also the bioresorbable aliphatic polyesters can generally only be dissolved in highly toxic solvents such as chloroform and methylene chloride. To date, only bioresorbable scaffolds in combination with particle leaching have been processed by 3DP. In addition, the mechanical properties and accuracy of the specimens manufactured by 3DP still need to be significantly improved.

Other RP technologies, such as stereolithography (SLA) and Selective Laser Sintering (SLS), were used for fabrication of non-bioresorbable polymers scaffolds. SLA is limited by the types of polymers it can use, because it uses only limited photopolymerizable resins supplied from the machine manufactures. And those resins are not suitable for cell culture purposes. SLS, on the other hand, although can use thermoplastic resin particles, bear the same issues as 3DP, i.e. the unbound polymer particles are difficult to remove, and the mechanical properties and the accuracy of the specimens will have to be significantly improved.

Fused Deposition Modeling (FDM) is another manufacturing process that produces 3D objects through the extrusion and deposition of individual layers of thermoplastic materials. It begins with the creation of a conceptual CAD model on the computer. The CAD model is imported into a slicing software (e.g., the QuickSlice™. software offered by Stratasys Inc. of Eden Prairie, Minn.) which mathematically dissects the conceptual 3D model into a series of horizontal layers, followed by the creation of deposition paths within each sliced layer. The tool path data is then downloaded to the FDM machine for scaffold fabrication. The FDM system operates in the X, Y and Z axes. In effect, it draws the designed model one layer at a time. The FDM method involves the melt extrusion of filament polymer materials through a heated nozzle and deposition as thin solid layers on a platform. The nozzle is positioned on the surface of a build platform at the start of fabrication. It is part of the extruder head (FDM head), which also encloses a liquefier to melt the filament material fed through two counter-rotating rollers. Each layer is made of "raster roads" "deposited in the x and y directions. A "fill gap" can be programmed between the roads to provide horizontal channels. Subsequent layers are deposited with the x-y direction of deposition—the "raster angle" programmed to provide different lay-down patterns.

In a FDM system, the thermoplastic polymer used in fabricating the part has to be in a filament form in order for the thermoplastic polymer material to feed into the temperature-controlled FDM extrusion head, where it is heated to a semi-liquid state. The head extrudes and deposits the material in thin layers onto a fixtureless base. The head directs the material into place with precision. The material solidifies, laminating to the preceding layer. Parts are fabricated in layers, where each layer is built by extruding a small bead of material, or road, in a particular lay-down pattern, such that the layer is covered with the adjacent roads. After a layer is completed, the height of the extrusion head is increased and the subsequent layers are built to construct the part. The layer by layer fabrication allows design of a pore structure which varies across the scaffold structure. So far, only a few non-resorbable polymeric materials, such as polyimide, ABS, and polycarbonate are available from the FDM manufacturer Stratasys Inc for se in the FDM RP systems. If a different polymer materials need to be used in the FDM RP system, the material has to be pre-manufactured into a filament form which, although can be done by melt extrusion, will add an extra step to the manufacturing process. Also, the FDM process involves two hot melting process, i.e making filament by melt extrusion and FDM melt deposition. It is well known that repeated heating will cause polymer to degrade and produce leachable smaller molecules, which is not a problem in making a model for industrial use, but will be a significant issue for cell culture use. Therefore, FDM process is not suitable for making porous 3D polymer constructs for cell culture use.

Therefore, there is a need to have a RP system which can directly use thermal plastic polymer particles/pellets without first making polymer filament. An RP system which has a hot melt extrusion system will be able to directly deposit polymer material in a filament form and therefore minimizes the possibility of heat induced degradation. This system would be particularly suitable for making 3D construct for cell culture use.

SUMMARY OF THE INVENTION

It is therefore an object of the present invention to provide methods to fabricate porous non-cytotoxic polymeric 3D construct for biomedical applications, such as conducting 3D cell culture in cell culture plates, flasks, bags and bioreactors.

The present invention provides an RP system which can directly use hot melt polymers for fabricating porous 3D cell culture insert based on CAD design. The RP system can use polymer pellets/particles/beads directly without the need to fabricate polymeric filament first. To realize the direct use of polymer hot melt, the RP system uses a hot melt chamber which is mounted on a robotic dispensing arm or a XYZ motion control system. The hot melt chamber is equipped with a delivery mechanism, such as compressed air, a plunger, a extrusion screw, or a combination of two of the above, to force the molten polymer passing through a nozzle, which is attached to the hot melt chamber. The extruded polymer thin filament deposits onto the positions according to the computer generated model, in a layer-by-layer fashion, similar to FDM. The present invention can use any type of thermal plastic polymer pellets, beads, particles, which are suitable for extrusion and injection molding, as well as composites of two or more different thermal plastic polymer blends, inorganic particle/thermal plastic composites. The one step hot melting RP process minimizes the possibility of heat induced polymer degradation and is particularly suitable for making 3D construct for cell culture use.

The polymer melt extrusion mechanism is equipped with a on/off switch or a regulator which controls the extrusion rate of the polymer melt. The switch can be a pressure regulator or a pressure valve that switch the compressed air on/off when compressed gas is used for extrusion of polymer melt. When the switch is on, the polymer melt will be extruded though the nozzle tip by the air pressure inside the melt chamber. The switch can also be an electronic switch which turns on/off the motor that controls the rotational movement of the screw in a micro single-screw extruder.

DETAILED DESCRIPTION OF THE INVENTION

The present invention provides an RP system which can directly use hot melt polymers for fabricating porous 3D construct based on CAD model. The RP system can use polymer pellets/particles/beads directly without the need to fabricate polymeric filament first. To realize the direct use of polymer hot melt, the RP system uses a hot melt chamber which is mounted on a robotic dispensing arm or a XYZ motion control system. The hot melt chamber is equipped with a delivery mechanism, such as compressed air, a plunger, a extrusion screw, or a combination of two of the above, to force the molten polymer passing through a nozzle, which is attached to the hot melt chamber. The extruded polymer thin filament deposits onto the positions according to the computer generated model, in a layer-by-layer fashion, similar to FDM. The present invention can use any type of thermal plastic polymer pellets, beads, particles, which are suitable for extrusion and injection molding, as well as composites of two or more different thermal plastic polymer blends, inorganic particle/thermal plastic composites. The one step hot melting RP process minimizes the possibility of heat induced polymer degradation and is particularly suitable for making 3D construct for biomedical applications, such as cell culture use.

The polymer melt extrusion mechanism is equipped with a on/off switch or a regulator which controls the extrusion rate of the polymer melt. The switch can be a pressure regulator or a pressure valve that switches the compressed air on/off when compressed gas is used for extrusion of polymer melt. When the switch is on, the polymer melt will be extruded though the nozzle tip by the air pressure inside the melt chamber. The switch can also be a electronic switch which turns on/off the motor that controls the rotational movement of the screw in a micro single-screw extruder.

The materials used in this system can be a single type of thermal plastic polymer or a blend of two or more polymers in a preformed form.

The materials used in this system can be a physical mixture of pellets/beads/particles of two or more thermoplastic polymers in a premixed mixture form.

The materials used in this system can be a physical mixture of inorganic particles and thermoplastic polymer particles/pellets/beads. In this, the micro single screw extruder is particularly suitable system for the process, as it will result in a more homogeneous dispersion of inorganic particle in polymer matrix.

The diameter of the extruded polymer filament can be controlled by the inner diameter of the extrusion nozzle and the extrusion speed.

Coolant or air can be used to cool the extruded polymer filament

Figure 1:
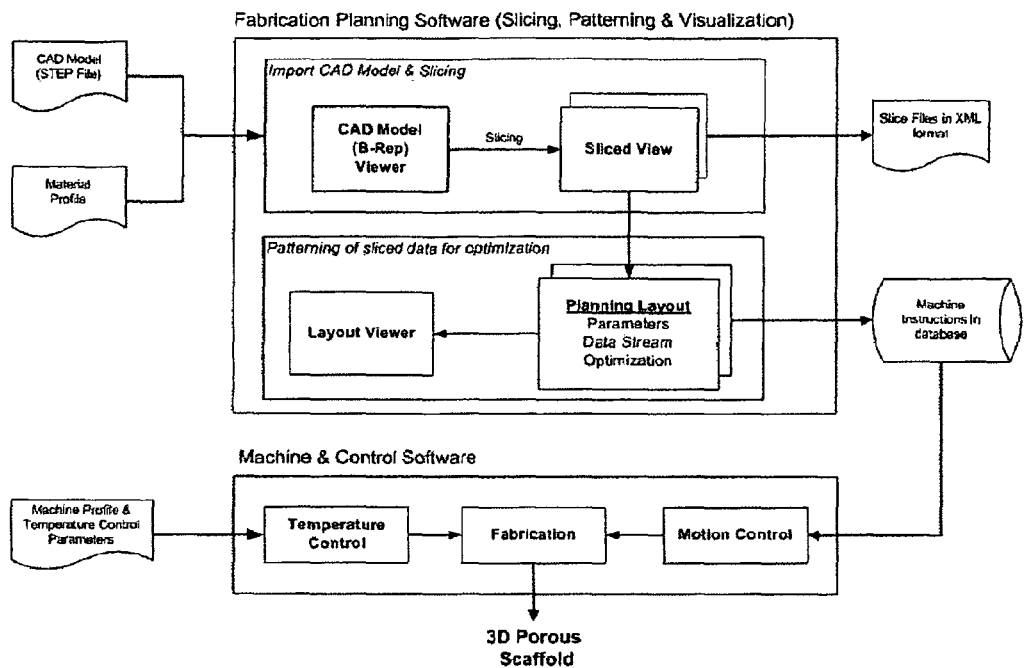
FIG. 1 represents a flow chart of the data preparation for manufacturing process.
Figure 2A:
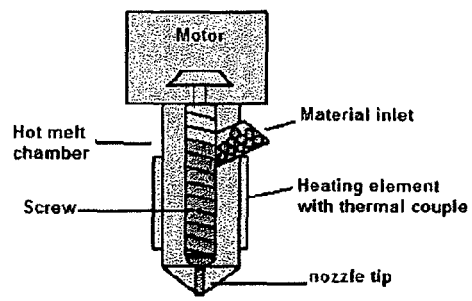
FIG. 2a shows one micro single screw extruder used in the system.
Figure 2B:
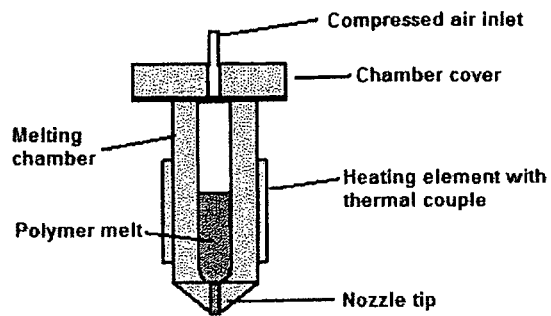
FIG. 2b shows a hot melt chamber uses compressed air for extrusion of polymer hot melt.
Figure 3A:
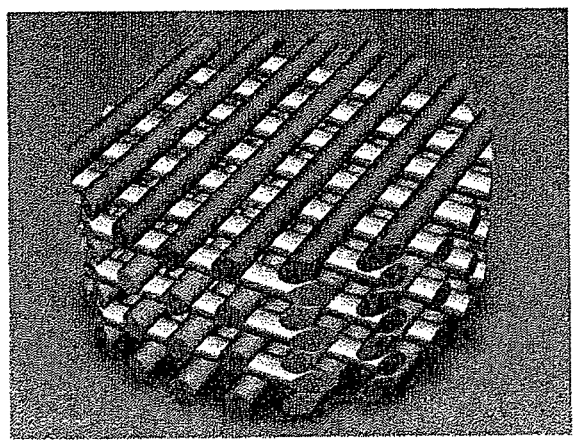
FIG. 3a shows one embodiment of a cell culture construct fabricated using the system.
Figure 3B:
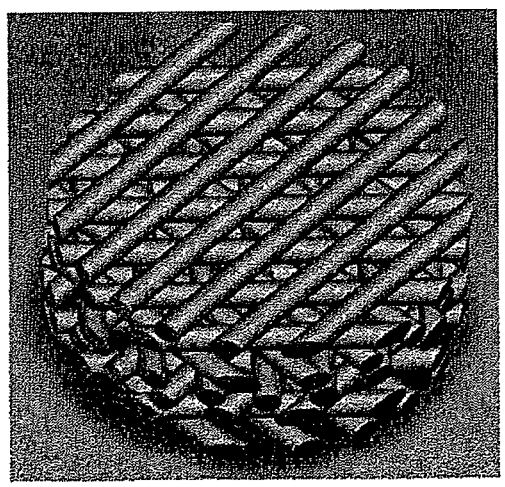
FIG. 3b is a cross-section of the 3D construct with different configuration.
Figure 3C:
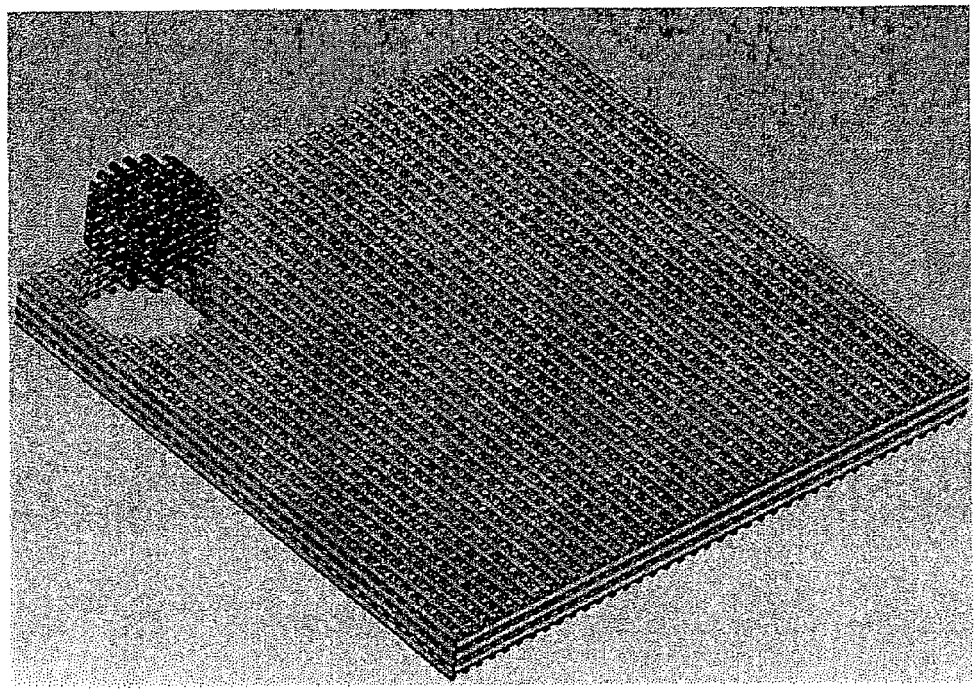
FIG. 3c shows one embodiment of a cell culture construct is punched out from a larger piece cell culture construct

A large porous 3D construct can be made using this RP system and then several smaller 3D cell culture inserts can be cut or pounced out from it (FIGS. 3a, b and c).

The parts manufactured using this system can be further surface treated to improve the surface property of the construct in order to regulate the cellular response to the construct in cell culture studies.

The 3D cell culture inserts are fabricated into sizes and shapes that make them fit into the cell culture vessels. The present invention is particularly useful for preparing the 3D constructs as disclosed in U.S. Ser. No. 12/030,615 filed Feb. 13, 2008 entitled "Three Dimensional Cell Culture Construct And Apparatus For Its Making", the disclosure of which is hereby incorporated by reference in its entity for all purposes.

Method of Making Cell Culture Construct

Scaffolds are fabricated using PCL using the rapid prototyping system. The 3-dimensional CAD model is dissected into a series of 2-dimensional slices with a specified layer thickness using a slicing software. The amount and direction of the extrudate (called "raster" in FDM's context) are determined by configuring various build parameters for individual layers. The build parameters include the road width of rasters, fill gap between rasters, slice thickness and raster angle. Specific combinations of these parameters and the liquefier temperature are required to achieve smooth and consistent extrudate flow and raster deposition with sufficient adhesion between adjacent layers. The head speed, fill gap, and raster angle for every layer are programmed through the slicing software package and saved as standard XML (Extensible Markup Language) in a slice file. The slicing software will further translate the 2D slices' data into corresponding machine instructions saved in XML or database format. Finally these instructions will be read by a control software to drive the machine to fabricate the porous constructs. The hot melt chamber temperature is set at above the melt temperature of the polymer (or processing temperature) with an accuracy of ±1 degree. C. and the enclosure temperature remains at 25±1.degree. C. (room temperature) throughout the fabrication process.

Constructs of various porosities are produced by setting a constant ratio of the wall thickness to the channel width for every layer. Various lay-down patterns are possible, giving rise to complex 3D geometrical patterns. For a giving polymer, a set of preferred combinations of flow rate, head speed and melt chamber temperature have been established in order to produce sufficient adhesion between extrudate of adjacent layers at their cross-points while maintaining vertical channels between them to provide interconnectivity throughout the entire construct structure.

A large square shaped porous 3D construct is fabricated. Multiples cell culture inserts are punched out using a cutting die.

Alternatively, multiple 3D cell culture inserts can be fabricated directly on the platform according to the CAD design.

The invention claimed is:

1. A Rapid Prototyping System comprising:
   (i) a non-transitory computer readable medium for storing code for implementing fabrication of three-dimensional porous cell culture constructs having at least two layers, the code comprising:
      (a) code for user selected parameters corresponding to each layer of a three-dimensional porous cell culture construct; and
      (b) code for initiating a machine to fabricate the three-dimensional porous cell culture construct having the selected parameters; and
   (ii) a machine communicatively connected to the code the machine having:
      (a) a regulator control; and
      (b) an arm having a hot melt chamber mounted thereon, the hot melt chamber having a removable nozzle with a controllable inner diameter, wherein the nozzle extrudes heated thermoplastic polymer having a diameter corresponding to the inner diameter of the nozzle.

2. The Rapid Prototyping System of claim 1, wherein the hot melt chamber comprises a micro extrusion system.

3. The Rapid Prototyping System of claim 2, wherein the arm comprises an XYZ motion control system.

4. The Rapid Prototyping System of claim 2, wherein the micro extrusion system is a micro single screw extruder.

5. The Rapid Prototyping System of claim 4, wherein the regulator control controls the extrusion rate.

6. The Rapid Prototyping System of claim 5, wherein the regulator control said switch controls rotation rate.

7. The Rapid Prototyping System of claim 2, wherein the micro extrusion system utilizes compressed gas for polymer melt extrusion.

8. The Rapid Prototyping System of claim 7, wherein the regulator control controls the extrusion rate.

9. The Rapid Prototyping System of claim 8, wherein the regulator control controls air pressure in said micro extrusion system.

10. The Rapid Prototyping System of claim 2, further comprising a plunger for the micro extrusion system.

11. The Rapid Prototyping System of claim 10, further comprising a motor to operate the plunger.

12. The Rapid Prototyping System of claim 11, wherein the regulator control controls the movement of said plunger in said micro extruder.

13. The Rapid Prototyping System of claim 1, wherein the arm is a robotic arm.

14. The Rapid Prototyping System of claim 1, wherein the removable nozzle has a controllable inner diameter range from 5 microns to 2 mm.

15. A method of making a cell culture construct comprising: (i) adding a polymer into the hot melt chamber of the Rapid Prototyping System of claim 1; (ii) setting the hot melt chamber at above the melting temperature of the polymer; (iii) selecting parameters for individual layers of a three-dimensional structure, including the diameter of the extruded polymer; and (iv) initiating the code to initiate the machine to fabricate the cell culture construct.

16. The method of claim 15, wherein the parameters are selected from the group consisting of width of the extrudate, fill gap between the extrudate, slice thickness, extrudate angle, flow rate and a combination thereof.

17. The method of claim 15 comprising punching out multiple porous constructs of a desired shape using a cutting die.

* * * * *